June 27, 1961 W. B. CALLAWAY ET AL 2,989,910
PRINTING APPARATUS
Filed Nov. 6, 1959 2 Sheets-Sheet 1

INVENTORS W. B. CALLAWAY
A. A. DELTUVIA, JR.
BY John C. Morris
ATTORNEY

INVENTORS W. B. CALLAWAY
A. A. DELTUVIA, JR.
BY John C. Morris
ATTORNEY

United States Patent Office 2,989,910
Patented June 27, 1961

2,989,910
PRINTING APPARATUS
William B. Callaway, Bloomfield, N.J., and Andrew A. Deltuvia, Jr., Brooklyn, N.Y., assignors to Bell Telephone Laboratories, Incorporated, New York, N.Y., a corporation of New York
Filed Nov. 6, 1959, Ser. No. 851,275
8 Claims. (Cl. 95—75)

This invention relates to data processing means and particularly to a printing apparatus for processing rolls of data bearing negative film.

In the telephone industry, surveys of the usage made of various portions of central office switching equipment are essential for utilizing existing equipment efficiently and for determining when additional equipment will be needed. Usage information is recorded by registers which numerically reflect the number of times and the length of time particular pieces of equipment are used. By taking periodic readings of the number registers, the traffic carried by each piece of equipment during the interval between readings may be determined.

Apparatus has been developed that photographs on a single exposure of roll film a bank of, for example, 150 number registers. The apparatus automatically photographs the registers at predetermined intervals during a predetermined period of each day. Presently, usage information is acquired from the negatives obtained from this photographic apparatus by making enlarged prints of the individual frames of the negatives or by placing the negatives in a reader. Successive frames of the negative are then examined for the successive numerical readings of each of the registers, and the differences between the successive readings are computed either mentally or by scratch note calculations. Unfortunately attempts to mentally calculate the difference between successive readings result in frequent errors. On the other hand, writing down the successive readings for each register and then computing the difference is very tedious and time consuming.

An object of this invention is to provide an apparatus for processing a data bearing negative film so that the data carried by the negative is placed in a more accessible and easily handled arrangement.

Another object of this invention is to reduce the possibility of error in the handling of the data.

A further object of this invention is to decrease the time required to handle the data.

A still further object of this invention is to provide a printing apparatus that will automatically print two successive frames of a data bearing negative onto a single frame of positive film so that the single frame of the positive film has the related numerical data positioned for easy and quick calculation.

These and other objects of the present invention are achieved in an illustrative embodiment thereof wherein the invention comprises light projecting means positioned above a flat, elongated, opaque mask that has three spaced columns of light transmitting elements formed therein. Drive means are provided for moving a data bearing negative film superimposed on an unexposed positive film beneath the mask at a constant rate of speed transverse to the column of light transmitting elements, the negative being between the mask and the positive. Each frame of the data bearing negative carries a plurality of number groups arranged in vertical columns and horizontal rows. Aligning means position the mask with respect to the negative so that each number group in a vertical column passes beneath a respective light transmitting element in the columns of elements, the elements being of such size and spacing that only the number groups themselves and not the spaces between the number groups are exposed. Because of the size and spacing of the elements, only spaced areas of the positive are exposed beneath each column of elements, and guide means position the positive with respect to each column of light transmitting elements so that different spaced areas of the positive are exposed beneath each column.

As the negative superimposed upon the positive moves beneath the first column of elements, the number groups carried by the negative are printed on spaced areas of the positive. Between the first and second columns of elements a delaying means increases the path of travel of the positive with respect to the negative a distance equal to the distance between successive frames of the negative so that as the negative and positive pass beneath the second column of light transmitting elements, a subsequent frame of the negative is superimposed upon a prior frame of the positive. In addition, between the first and second columns of elements displacing means laterally displace the positive with respect to the negative so that as the negative and positive pass beneath the second column of elements, the number groups carried by the subsequent frame of the negative are printed above the number groups previously printed on the positive.

Thus a feature of this invention resides in an apparatus comprising a mask having a plurality of spaced columns of light transmitting elements, a light source positioned on one side of the mask, and means adapted to move data bearing negative film and positive film in a predetermined manner at a constant rate of speed along the other side of the mask.

A further feature of the invention resides in an apparatus wherein the light transmitting elements are positioned in a particular manner and the negative and positive film are moved with respect to the light transmitting elements so that different spaced portions of the positive film are exposed beneath each column of light transmitting elements.

A still further feature of the invention resides in an apparatus wherein the positive film and the data bearing negative are moved with respect to each other so that each frame of the positive film is exposed to the data from two frames of the data bearing negative.

A complete understanding of the invention and of this and other features and advantages thereof may be gained from consideration of the following detailed description taken in conjunction with the accompanying drawing wherein embodiment of the invention is illustrated. It is to be expressly understood, however, that the drawing is for the purposes of illustration and description and is not to be construed as defining the limits of the invention.

Figure 1:
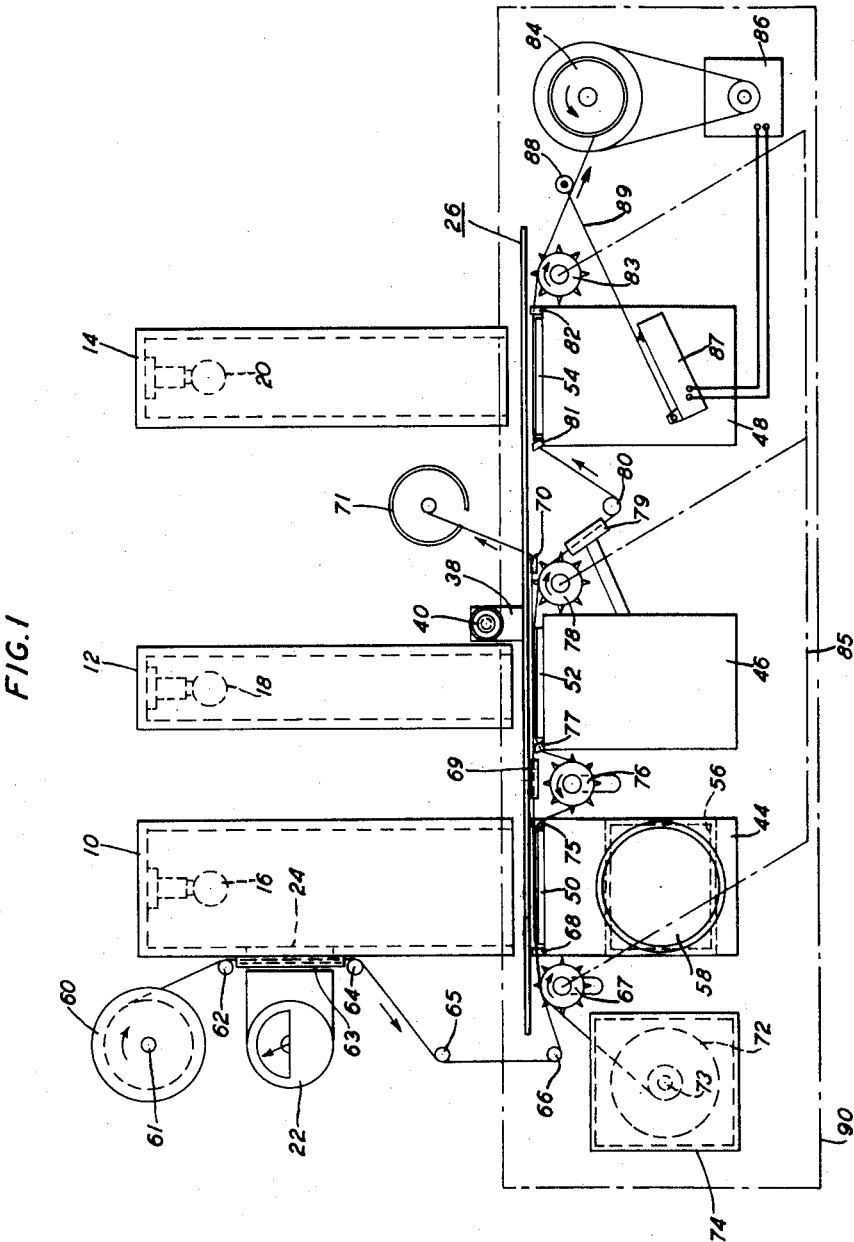
FIG. 1 is a side elevation of the printing apparatus constructed in accordance with the present invention.

Referring now to the drawings and particularly to FIG. 1, the printing apparatus of this invention comprises housings 10, 12, and 14 having lamps 16, 18 and 20 respectively secured to closed upper ends thereof. Each lamp has an individual intensity control (not shown) to permit equalization of the intensity of the three lamps, and there is a common intensity control (not shown) to adjust the intensity of all the lamps simultaneously. A light meter 22, mounted adjacent an opening 24 in the housing 10 facilitates adjusting the lamps to a desired intensity once the individual intensities of the lamps have been equalized.

The housings 10, 12, and 14 respectively serve to direct the light emitted by the lamps 16, 18, and 20 through open lower ends of the housings upon a printing mask 26 positioned therebelow. The mask, shown most clearly in FIG. 3, comprises an opaque body 28 having columns of spaced light transmitting elements 30, 32, and 34. For simplicity, these and all other light transmitting elements will be referred to as apertures, but it is to be understood that the term encompasses any means of providing light transmitting elements in an opaque body.

The height of each of the apertures in the columns 30, 32, and 34 is determined by the height of the individual characters comprising the bits of data carried by the roll film negative that is processed by the printing apparatus. The height of the apertures is at least equal to the height of the individual characters, and advantageously it is slightly greater than the height of the characters.

The width of the apertures is important only insofar as it is one of three factors that affect the amount of exposure received by the positive film that is processed by the printing apparatus. The other two factors are the intensity of the light emitted by the projection lamps and the rate of speed at which the negative and positive film move beneath the mask. Knowing the desired light intensity, and the rate of speed of the film, it is within the skill of one in the art to select the width of aperture which will give the desired exposure.

The spacing between apertures in each column of apertures is the same as the spacing between each bit of data and the bit of data above it on the data bearing negative. However, in order for the negative to be processed by the printing apparatus, the spacing between bits of data must be at least slightly greater than twice the height of the characters comprising the bits of data.

The number of apertures in each of the columns 30, 32, and 34 is equal to the number of bits of data contained in a column on the data bearing negative. Thus, if for example, the negative carries bits of data that are arranged in vertical columns of 15 and horizontal rows of 10, each column in the mask would have 15 apertures.

The apertures occupying the same relative positions in the columns 30 and 32 are aligned with respect to each other. The column 34, however, is shifted downward a distance at least equal to the height of the individual characters comprising the bits of data carried by the data bearing negative, and advantageously the distance is slightly greater than the height of the characters.

A slot 36 is formed in the mask between the columns 32 and 34, and a threaded member 38 is fixedly secured to the mask adjacent to the slot. A screw 40 that is rotatably mounted in a fixed bushing 42 engages the nut. The bushing allows the screw to rotate, but prevents the screw from moving axially. Thus, rotation of the screw in one direction or the other moves the mask up or down as viewed in FIG. 3.

Referring again to FIG. 1, supporting members 44, 46, and 48 are positioned a spaced distance below the mask 26 in line with the columns of apertures 30, 32, and 34. Plates 50, 52, and 54 are respectively mounted to the upper surface of the supporting members, and the plates are spring loaded against the mask. The plate 50 has an aperture therein that includes the column of apertures 30 above it. The support member 44 is hollow, and it has a mirror 56 mounted within it at an angle of about 45 degrees to the plane of the mask. A magnifying lens 58 is mounted in the front of the supporting member, and by looking therethrough the column of apertures 30 is plainly visible.

The data bearing negative is wound on a spool 60 that is positioned on a rotatable spindle 61 to the left of the housing 10. The negative passes from the spool over a roller 62 and through a passageway 63 that is mounted between the light meter 22 and the opening 24 in the housing 10. On leaving the passageway, the negative passes around rollers 64, 65, and 66 and over a drive sprocket 67. The drive sprocket is mounted so that it can be moved out of the path of the film when it is desirable to do so. From the drive sprocket the film moves through a film guide 68, between the plate 50 and the mask 26, through a film guide 69, between the plate 52 and the mask, through a film guide 70, through the slot 36 in the mask, and into a take-up cassette 71.

A bulk roll 72 of positive film is positioned on a rotatable spindle 73 and housed in a container 74. The positive film passes from the roll over the drive sprocket 67, through the film guide 68, between the plate 50 and the mask 26, through a film guide 75, and around a delay sprocket 76. The delay sprocket is vertically adjustable so as to increase the path of travel of the positive film with respect to the negative film a distance equal to a multiple of complete frames of the negative. In addition, the delay sprocket is tilted from a vertical plane so that in conjunction with an angled film guide 77 mounted on the support member 46, the positive film is laterally shifted through a predetermined distance in the direction of the arrow A in FIG. 2. The positive film is shifted a distance at least equal to the height of the individual characters comprising the bits of data carried by the data bearing negative, and advantageously the distance is slightly greater than the height of the characters. The data bearing negative and the positive film are thus displaced laterally and longitudinally relative to each other as they move between the plate 52 and the mask 26.

The positive film on leaving the plate 52 moves over a drive sprocket 78, through a film guide 79, around a roller 80, and through a film guide 81. The roller 80 is tilted from a vertical plane and the film guide 81 is angled to laterally displace the positive film in the direction of the arrow B in FIG. 2. The positive film is shifted back the exact distance that it was shifted by the delay sprocket 76 and the film guide 77. The positive film therefore moves beneath the column of apertures 34 along the same path that it moved beneath the column of apertures 30. From there the positive film moves through a film guide 82, over a drive sprocket 83, and into a take-up spool 84.

The film guides 68, 69, 70, 75, 77, 79, 81 and 82 very accurately guide the data bearing negative and the positive film so that they are precisely positioned with respect to each other and with respect to the columns of apertures 30, 32, and 34 in the mask 26. In one specific embodiment the desired accuracy was achieved by having one edge of the guides fixed and the other edge of the guides biased towards the fixed edge whereby the film is restrained between the guides.

The drive sprockets 67, 78, and 83 are chain driven by a single motor indicated by the number 85, and the take-up spool 84 is driven by a motor 86 under the control of a microswitch 87. A roller 88 is secured to the free end of an arm 89, the other end of which is pivotally mounted to the microswitch. The roller rides on the positive film, and when there is slack in the positive film between the drive sprocket 83 and the take-up spool 84, the weight of the roller pivots the arm downward, operating the microswitch to energize the motor. The motor commences to wind the positive film into the take-up spool and as the slack in the positive film is removed, the roller 88 and thereby the arm 89 are raised by the positive film. When the arm is raised to a certain height, it operates the microswitch to deenergize the motor.

The lower ends of housings 10, 12, and 14 and all of the elements of the printer below the housings are enclosed in a light, tight enclosure indicated by the numeral 90.

Operation

Assuming that a fresh roll of bulk positive film is being started, the roll 72 of positive film is placed within the container 74 on the spindle 73 and the film threaded over the drive sprocket 67, through the film guide 68, between the plate 50 and the mask 26, through the film guide 75, under the delay sprocket 76, through the film guide 77, between the plate 52 and the mask, over the drive sprocket 78, through the film guide 79, under the roller 80, through the film guide 81, between the plate 54 and the mask, over the drive sprocket 83, under the microswitch roller 88, and into the take-up spool 84.

With the loading of the positive film completed, the lamps 16, 18, and 20 are turned on and the individual intensities of the lamps are equalized by means of a conventional portable light intensity meter. A spool 60 containing the data bearing negative is placed on the spindle 61 and the film inserted through the passageway 63. The light emitted by the lamp 16 passes through the opening 24 in the housing 10, through the negative, and impinges upon the light meter. The common intensity of the lamps is then adjusted until a predetermined reading on the light meter is achieved. This adjustment enables the printing apparatus to maintain constant exposure of the positive film even though the densities of different rolls of the data bearing negatives vary.

Subsequent to this adjustment the drive sprocket 67 is moved out of the path of the film, and the negative is moved under the roller 64, over the roller 65, around the roller 66, through the film guide 68, between the mask 26 and the positive film, and through the film guide 69. Since the light emitted by the lamp 16 passes through the column of apertures 30 in the mask 26, through the clear areas of the negative, through the positive film which is translucent, through the aperture in the plate 50, and is reflected by the mirror 56 through the magnifying lens 58, the negative may be moved along its longitudinal axis so that by looking through the magnifying lens, characters comprising the bits of data carried by the negative are visible. The screw 40 on the mask is then rotated, moving the mask up or down as shown in FIG. 3 so as to center the individual apertures in the column 30 directly over the individual characters of the bits of data.

With the preceding accomplished, the lights are turned off, the negative is removed from between the positive film and the mask 26, and the drive sprocket motor 85 and the take-up spool motor 86 are briefly energized to move the positive film exposed during the above-mentioned adjustment onto the take-up spool 84. The lead of the negative is then placed through the film guide 68 and between the mask and the positive film, and the drive sprocket 67 is returned to its original position so that the teeth thereon engage the sprocket holes in both the negative and the positive film. All of the preliminary adjustments are now completed, and the apparatus is in condition to commence to operate.

Figure 2:
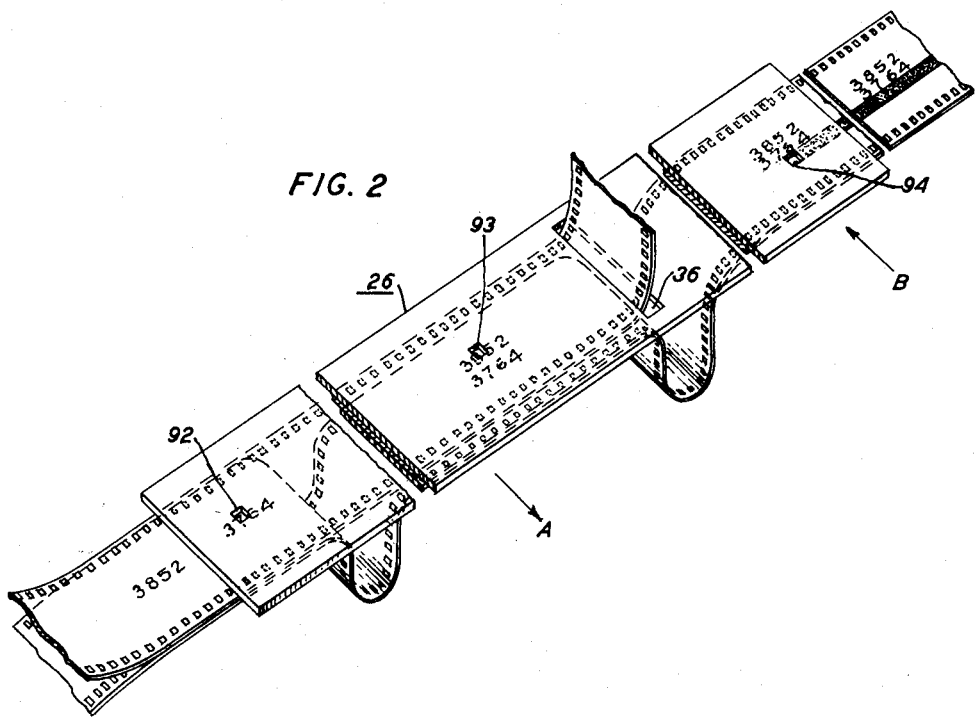
FIG. 2 is a perspective view depicting the movement of the data bearing negative and the positive film through the printing apparatus.

The movement of the data bearing negative and the positive film through the printing apparatus is most clearly seen in FIG. 2. For ease of explanation FIG. 2 shows an abbreviated data bearing negative superimposed upon positive film, and each fragment in the figure is a step in the processing of the film. The number 3764 represents one of a plurality of register readings photographed on a single frame of the data bearing negative at, for example, 9 a.m. The number 3852 represents a reading of the same register photographed, for example, at 10 a.m. on the subsequent frame of the negative. The aperture 92 represents one of the apertures in the column of apertures 30, and the apertures 93 and 94, respectively, represent apertures in the column of apertures 32 and 34 that occupy the same relative position as the aperture 92.

Figure 3:
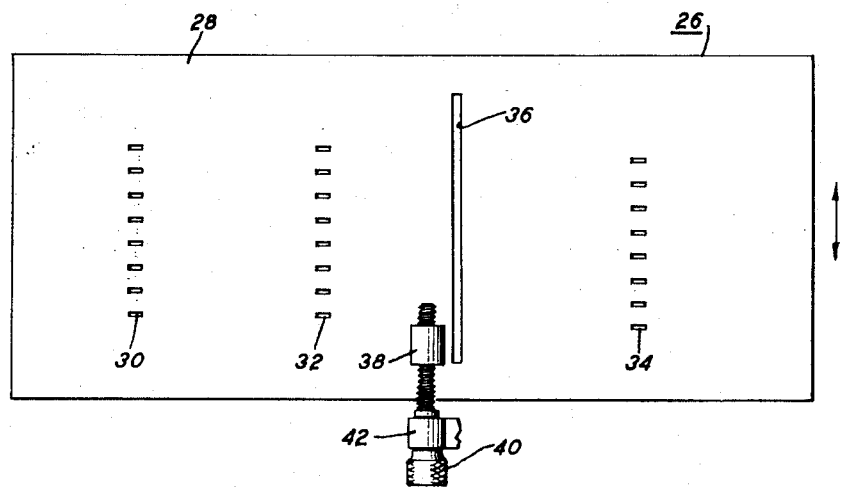
FIG. 3 is a plan view of the mask showing the spaced columns of light transmitting elements.

Referring now to FIGS. 1, 2, and 3, a main switch (not shown) is turned on, energizing the drive sprocket motor 85, the take-up spool motor 86 and the lamps 16, 18, and 20. The drive sprockets move the data bearing negative and the positive film at a constant speed, and as the negative and positive film move underneath the column of apertures 30, they are guided by the film guide 68 so that the negative is superimposed directly over the positive film, the plate 50 pressing both the negative and the positive film into intimate contact with the mask.

Thus as the 9 a.m. and 10 a.m. frames of the negative pass beneath the aperture 92, the light emitted by the lamp 16 prints the register readings 3764 and 3852 onto the positive film. Since the apertures in the column of apertures 30 are positioned spaced distances apart, only spaced portions of the positive film are exposed as the positive film passes beneath this first column of apertures.

The positive film moves through the film guide 75 and around the delay sprocket 76, while the negative moves through the film guide 69. The delay sprocket increases the path of travel of the positive film a distance equal to one or more complete frames, and the delay sprocket in conjunction with the film guide 77 laterally displaces the positive film in the direction of the arrow A in FIG. 2 through a distance slightly greater than the height of the characters comprising the register readings. The negative, on the other hand, moves straight across the space between the supporting members 44 and 46. Assuming that the delay sprocket is set for a single frame of longitudinal displacement, when the negative and positive film pass beneath the column of apertures 32 and are biased by the plate 52 into intimate contact with the mask, the 10 a.m. frame of the negative is superimposed upon the portion of the positive film that was previously exposed to the 9 a.m. frame of the negative. In addition, the lateral shifting of the positive film positions the 10 a.m. reading over a previously unexposed portion of the positive film that is above the portion of the positive film that had been exposed to the 9 a.m. reading. Thus as the negative and positive film pass beneath the aperture 93, the light emitted by the lamp 18 prints the reading 3852 directly above the portion of the positive film that had been exposed to the reading 3764. Again the size and spacing of the apertures in the column of apertures 32 is such that only spaced portions of the positive film are exposed, leaving other spaced portions on the positive film still unexposed.

After moving under the column of apertures 32, the data bearing negative and the positive film are separated. The negative moves through the film guide 70, through the slot 36 in the mask 26, and into the take-up cassette 71. The positive film moves over the drive sprocket 78, through the film guide 79, and around the roller 80. The film guide and the roller cooperate to shift the positive film in the direction of the arrow B in FIG. 2, laterally moving the positive film back the same distance it had been displaced before passing beneath the column of apertures 32. The positive film is therefore traveling along its original path as it moves through the film guide 81 and between the mask and plate 54.

The column of apertures 34 in the mask 26 is shifted in the direction of the arrow A in FIG. 2 whereby each aperture in the column is offset a predetermined distance from the apertures occupying the same relative position in the columns of apertures 30 and 32. The distance that the column of apertures 34 is offset with respect to the columns of apertures 30 and 32 is the same distance that the positive film is shifted before moving beneath the column of apertures 34. This positions the apertures over an unexposed portion of the positive film below the portions previously exposed to the register readings. Thus as the positive film passes beneath the apertures 94, the light emitted by the lamp 20 exposes a strip beneath the group of figures 3852 and 3764. This strip performs one of two functions depending upon the manner in which the positive film is used after it is developed. If the developed positive film is placed in a viewer, the strip serves to separate related bits of data into groups of two. If enlarged prints are made of each frame of the positive film, the strip provides a writing space on which calculations may be recorded.

After passing beneath the third column of apertures, he positive film moves through the film guide 82, over the drive sprocket 83, under the roller 88, and onto the take-up spool 84. When a complete negative has been printed in the above-described manner, the apparatus is turned off, and the positive film is cut adjacent the take-up spool. The spool is removed for developing of the positive film, and an empty spool is put in its place. The end of the positive film is started onto the empty spool, and the apparatus is then ready to print another negative.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A printing apparatus comprising an opaque masking means having a plurality of spaced columns of light transmitting elements, driving means adapted to move a negative film bearing bits of data arranged in columns and rows and a positive film along one side of the masking means transverse to the columns of elements, means for superimposing the negative film on the positive film as the films move past a first and a second of the columns of elements, means for illuminating the negative and the positive films through the columns of elements, the light transmitting elements being of such size and spacing that only the bits of data and not the columnar spaces between bits of data are illuminated, means adapted to cause lateral relative movement between the positive and the negative film as the films move between the first and the second of the columns of elements, the lateral relative movement being such that different spaced areas of the positive film are exposed by the illumination through the first and the second of the columns of elements, and means adapted to cause longitudinal relative movement between the negative and the positive film as the films move between the first and the second of the columns of elements, there being no relative movement between the positive and negative films as they move past the first and the second of the columns of elements.

2. A printing apparatus as in claim 1 wherein the driving means is adapted to move the data bearing negative film and the positive film at a constant rate of speed.

3. A printing apparatus as in claim 1 further including means adapted to align the mask means with respect to the data bearing negtaive film so that the individual light transmitting elements are in registration with individual bits of data on the negative film.

4. A printing apparatus as in claim 1 wherein the longitudinal moving means is adapted to increase the path of travel of the positive film a predetermined distance with respect to the path of travel of the negative film.

5. A printing apparatus as in claim 1 wherein the lateral moving means is adapted to displace the positive film with respect to the negative film a distance at least as great as the height of the tallest characters comprising the bits of data carried by the data bearing negative.

6. A printing apparatus according to claim 1 wherein the light transmitting elements have a height that is at least as great as the height of the tallest characters comprising the bits of data carried by the data bearing negative film.

7. A printing apparatus according to claim 1 wherein the spacing between the individual light transmitting elements in a single column is the same as the vertical spacing between bits of data in a column on the data bearing negative, the spacing between bits of data being not less than twice the height of the tallest characters comprising the bits of data.

8. A printing apparatus according to claim 1 wherein the light transmitting elements occupying the same relative position in the first and the second of the plurality of columns of light transmitting elements are aligned.

References Cited in the file of this patent

UNITED STATES PATENTS

| | | |
|---|---|---|
| 2,494,599 | Weckbaugh | Jan. 17, 1950 |
| 2,821,892 | Merten | Feb. 4, 1958 |